Dec. 1, 1931. J. LEDWINKA 1,834,529
VEHICLE BODY CONSTRUCTION
Filed Feb. 6, 1930 3 Sheets-Sheet 1

INVENTOR.
JOSEPH LEDWINKA.
BY
John P. Tarbox
ATTORNEY.

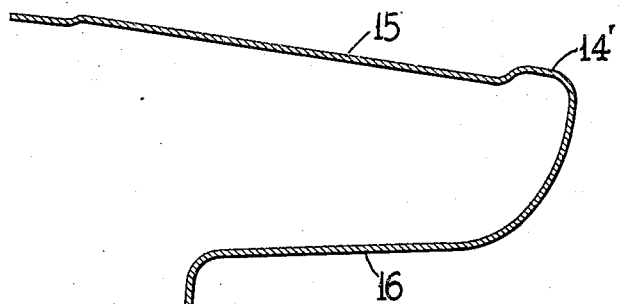
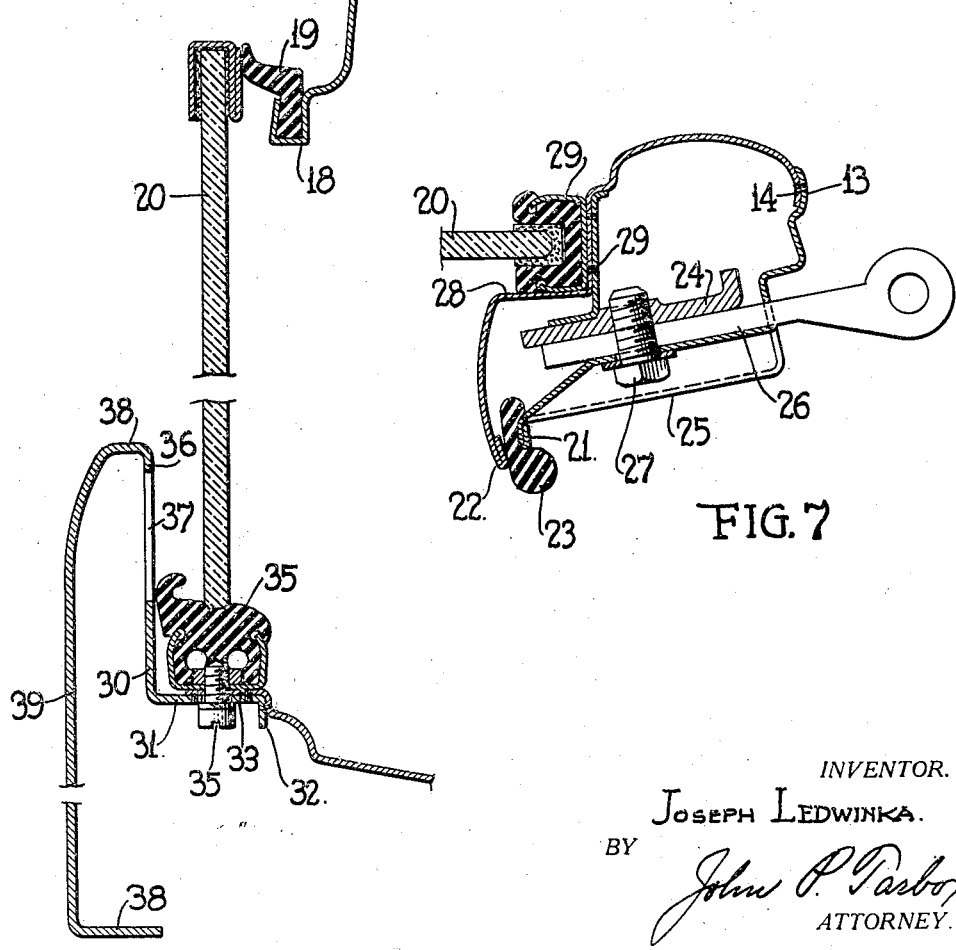
FIG. 8
FIG. 7
INVENTOR.
JOSEPH LEDWINKA.
BY
John P. Tarbox
ATTORNEY.

Patented Dec. 1, 1931

1,834,529

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

VEHICLE BODY CONSTRUCTION

Application filed February 6, 1930. Serial No. 426,202.

The invention relates to vehicle bodies and more particularly to vehicle bodies of pressed metal.

It is an object of my invention to provide a body of this class which can be in large part made up of relatively large stampings readily formed and joined together, and in which the structure around the windshield frame is simplified and adapted to receive a vertically sliding windshield panel.

These objects are attained by forming the edges of the adjoining panels in such manner and in so locating them in relation to the outer surface of the body to make them readily nestable along their edges and accessible for joining and for cleaning up the joints after joining, as by spot welding, and by making the various panels entering into the construction of such form and extent that they may be readily formed by relatively simple die stamping operations. Certain of the stampings are further so formed that they serve to perform functions additional to their usual functions.

Other and further objects and advantages will appear from the following detailed description when read in connection with the appended drawings showing one embodiment of the invention.

In the drawings,

Fig. 7 is a detail sectional view taken approximately on the line 7—7 of Fig. 6.

Fig. 8 is a central longitudinal vertical sectional view through the windshield frame.

Figure 5:
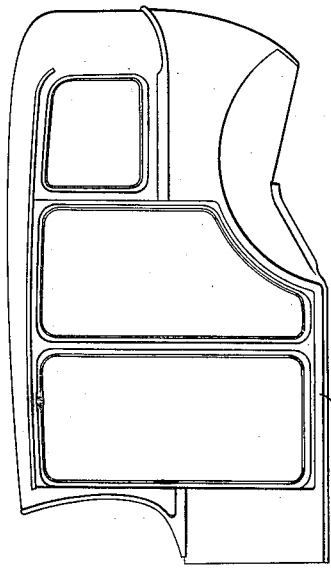
Figs. 3, 4 and 5 show, respectively, elevational views of the right side unitary sub-assembly, the front unitary sub-assembly and the left side unitary sub-assembly.
Figure 2:
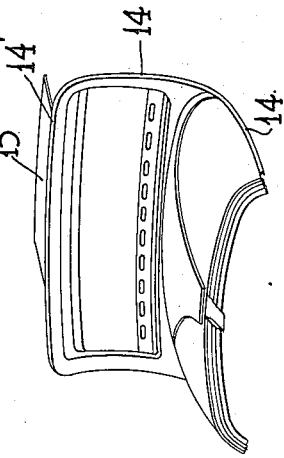
Fig. 2 is a similar view, looking at it from the opposite side, of a front unitary stamping forming a sub-assembly unit of said body.
Figure 4:
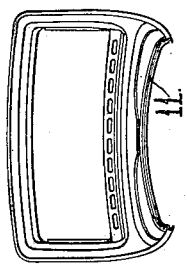
Figure 3:
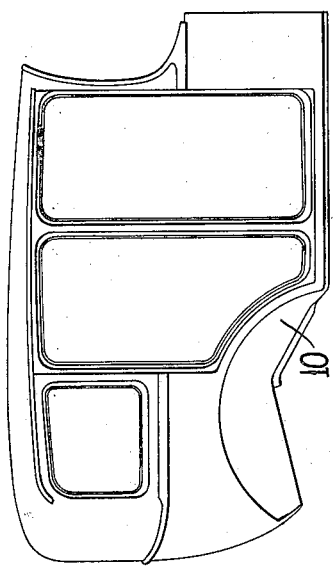

In accordance with my invention I form the front and sides of the body of three main stampings shown separately in Figs. 3, 4 and 5, and designated generally by the numerals 10 for the right side stamping, 11 for the front stamping, and 12 for the left side stamping.

These stampings may be, and preferably are, made of relatively light gauge sheet metal, and while for the purposes of illustration, the entire side of the body has been shown, as formed, of a unitary stamping and also the entire front of the windshield frame and the top of the cowl, it will be understood that, except as required for the purposes of the invention, the particular limits may be varied from those shown.

For ease of formation of the side stamping it terminates at the front in the outer side wall of the front post and curves forwardly in its upper edge from the post to form the side wall of the cowl, and is outwardly beaded, as shown at 13, to form an edge conformation adapted to nest with a corresponding beaded edge conformation 14 on the mating edge of the front unit 11 forming the top of the cowl and the front face of the front posts and the top header of the windshield.

By this location of the edge formation on the post and cowl where the surfaces of these elements are generally convex and by reason of the formation of the bead 13, 14 in the edges of the respective stampings, the parts are readily brought together in final assembly with the outwardly convex edge portions 13 and 14 in nested relation, and spot welded together. Any weld marks on the outer surface and the edge of the outer overlapped portion 13 may readily be cleaned off because of the generally convex conformation of the post at the joint. At the side of the cowl the beaded formation itself hides the edge of the joint and no smoothing down of the edge of bead 13, as in the post portions, is necessary.

Figure 1:
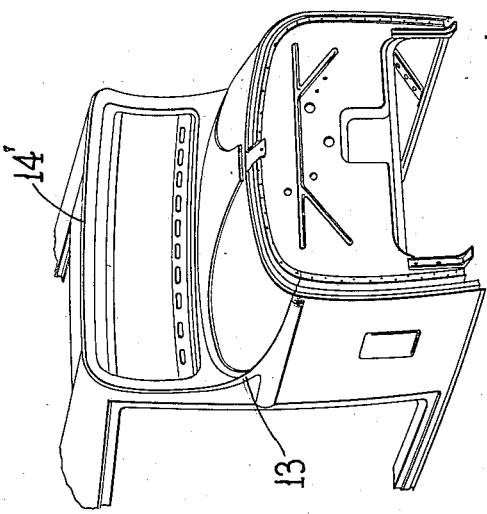
Fig. 1 is a perspective view of the front portion of a body constructed in accordance with the invention.
Figure 6:
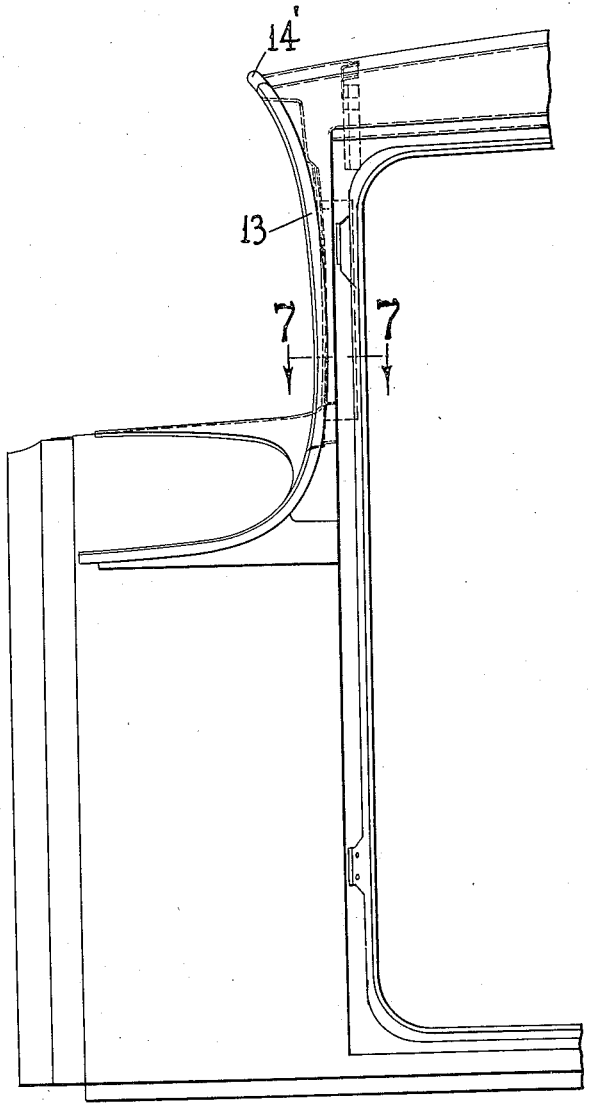
Fig. 6 is a side elevational view of the front portion of the assembled body.

The beaded portion 14 is continued across the top by a bead 14' in the edge of the roof portion 15 of the front unitary stamping to connect the side portions, as clearly in Figs. 1, 6 and 8. From the beaded portion 14 at the front edge of the roof portion 15, the stamping 11 is formed with a downwardly and rearwardly sweeping portion 16 which terminates in a downwardly extending portion 17 forming the top windshield header panel and this panel is formed, in accordance with the present invention, at its lower edge with an upwardly facing channel section portion 18 forming the edge of the windshield opening, and means for securing and holding the weather strip 19 for the top of the windshield opening, which engages with the windshield panel 20 in all positions thereof.

At the sides of the windshield the front post portions are hollow formations, the front and inner sides of which are formed in one stamping with the front unitary stamping 11, and the rear and outer side walls of which are formed out of the side unitary stamping 10, the joinder in their outer edges being that already described. In their inner edges the panels approach each other and are formed with reversely bent portions 21, 22 which reinforce the edges, the edges being adapted when the parts are secured together to secure between them the windlace 23.

The relatively light gauge outer face panel portions of the posts are reinforced by heavier gauge reinforce stampings 24 secured to the rear transversely extending portion 25 of the front post portion of the stamping 10, but shown spaced therefrom at the hinge location shown in Fig. 7 to permit the reception therebetween of a hinge leaf 26, secured in place by the screw 27.

Between its edges the front post portion of the front panel stamping 11 is formed with a rabbet 28 to receive the edge of the windshield panel and form a seat for the windshield panel guiding channel 29. The bottom of the rabbet 28 forming said seat is braced to the post reinforce 24 by an angle bracket 29 welded to the panel and to the post reinforce 24. Access for welding to the post reinforce may be had through holes (not shown) provided in the rear face of the rabbeted portion 28 which is covered by the window guiding channel.

At the bottom of the windshield opening the posts are interconnected by a header stamping 30, which has a horizontally-extending front portion 31 having an edge flange 32 forming an angular seat with which the correspondingly angled rear edge 33 of the stamping 11 forming the top of the cowl is adapted to nest, and to which it is secured as by spot welding. The channel 34 for holding the weather strip 35 for the lower edge of the windshield panel is seated on and secured to the overlapped portions of the windshield header and cowl top panel by the screws 35.

Rearwardly of the plane of the windshield panel the stamping 30 is formed with an upwardly extending portion 36 provided with spaced openings, as 37, therein, the portion 36 being extended rearwardly at the top as at 38, and then downwardly at 39 to form a finish for the inside of the body, and also a deflector for deflecting the air entering the openings 37 downwardly toward the bottom of the body. The header 30 is shown having its lower edge formed with a forward flange 38 still further strengthening and reinforcing the member. Such flange may also serve for the attachment of an instrument board.

What I claim is:

1. A vehicle body construction comprising a side panel stamping forming the side of a cowl, and a front door post portion extending above the cowl and having its front edge convexly curved to form a beaded edge merging into a correspondingly beaded edge in the cowl side portion, a front stamping forming the top of the cowl and the windshield frame, having its side edges correspondingly curved and beaded, the two stampings being welded together in their overlapped beaded edges.

2. A vehicle body construction comprising a front unit stamping forming the front post portions and the top of the windshield frame, the lower edge of the portion extending across the top of the windshield opening being reversely bent to form an inwardly facing channel to receive and secure a weather strip.

3. A vehicle body construction comprising a front unit stamping forming the top of the cowl and the front portions of the front posts and formed with outwardly curved side edge portions at the outer side of the posts adapted to nest with and form final assembly joints with the corresponding edge portion of a side unit stamping.

4. A vehicle body construction comprising a side unit stamping extending around a doorway opening and forwardly to form the side of the cowl, said side unit being extended upwardly to form the rear and outer portions of the front posts and provided in its edge with an outwardly curved portion forming a bead adapted to form a final assembly joint with a correspondingly curved edge of a front unit stamping.

5. A vehicle body construction comprising a unitary stamping forming the front and inner side of the front posts and rabbeted to receive the edge of the windshield, and a second stamping forming the rear and outer side of the post, the two stampings being beaded in their outer edges, and joined in the beaded edges.

6. A vehicle body construction comprising a hollow front post made of two relatively light gauge sheet metal stampings, one of said stampings having formed therein a rabbet to receive the edge of a windshield, and an inner reinforcing member for said post of relatively heavy gauge, secured to the other of said stampings, and means bracing said rabbeted portion from said reinforcing member.

7. A vehicle body construction comprising a hollow front post including two relatively light gauge stampings forming the outside face of the post and integrally joined along two adjacent edge portions, and spaced along their opposite edge portions to receive a windlace between said edge portions and secure it in place.

8. A vehicle body construction, comprising a lower windshield header stamping having a horizontally-extending portion forming a seat for the rear edge of a cowl panel, and the channel for receiving the lower edge of a vertcially sliding windshield, a vertically extending portion extended upwardly from the rear edge of said horizontal portion provided with ventilator openings, and a rearwardly and downwardly extending portion forming a deflector for the air passing through said openings when the windshield is raised.

In testimony whereof I hereunto affix my signature.

JOSEPH LEDWINKA.